(12) United States Patent  
Hedgepeth

(10) Patent No.: US 7,090,050 B1  
(45) Date of Patent: Aug. 15, 2006

(54) MOBILE TREE STAND

(76) Inventor: Virgil Eugene Hedgepeth, 704 Hillcrest Dr., Bradenton, FL (US) 34209

( * ) Notice: Subject to any disclaimer, the term of this patent is extended or adjusted under 35 U.S.C. 154(b) by 54 days.

(21) Appl. No.: 11/230,384

(22) Filed: Sep. 20, 2005

Related U.S. Application Data

(63) Continuation-in-part of application No. 10/173,033, filed on Jun. 17, 2002, now Pat. No. 6,945,361.

(51) Int. Cl.
*A01M 31/00* (2006.01)

(52) U.S. Cl. ........................... 182/142; 182/187

(58) Field of Classification Search ............... 182/142, 182/150, 187; 297/452.13, 274
See application file for complete search history.

(56) References Cited

U.S. PATENT DOCUMENTS

| | | | | |
|---|---|---|---|---|
| 797,722 A | * | 8/1905 | Crandall | 182/142 |
| 1,401,595 A | * | 12/1921 | Eberle | 297/274 |
| 2,433,859 A | * | 1/1948 | McCormick | 182/113 |
| 2,689,890 A | * | 9/1954 | Green | 200/61.13 |
| 3,528,657 A | * | 9/1970 | Krupsky | 472/118 |
| 3,731,762 A | * | 5/1973 | Sirls | 182/142 |
| 4,552,248 A | * | 11/1985 | Payne | 182/142 |
| 5,009,284 A | * | 4/1991 | Authement, Sr. | 182/142 |
| 5,685,103 A | * | 11/1997 | Wiggins | 42/94 |

* cited by examiner

*Primary Examiner*—Alvin Chin-Shue
(74) *Attorney, Agent, or Firm*—Dorothy Morse

(57) ABSTRACT

A mobile stand that can be suspended in a tree from an overhead location and thereafter be safely, quietly, and easily maneuvered by a seated occupant facing the tree into any position about the tree's circumference. The occupant can shoot in any direction without standing and also use the tree as a gun rest for a shot in any direction. The mobile nature of the stand provides hunters with the option of using a gun support lanyard attached to the upper part of its closed tubular frame or suspending cable which allows the lanyard to move with the hunter. The stand can also be used for ground level hunting, as well as indoor and outdoor recreational use by adults and children. One embodiment includes a back support that reclines into various postures, including a substantially horizontally-extending position. As an option, it can be readily disassembled for compact transport and storage.

20 Claims, 4 Drawing Sheets

MOBILE TREE STAND

CROSS REFERENCES TO RELATED APPLICATIONS

This patent application is based upon U.S. patent application which is a continuation-in-part of Ser. No 10/173,033, filed by the same inventor for the same subject matter on Jun. 17, 2002, now U.S. Pat. No. 6,945,361, and all benefit of the earlier application to which the inventor is entitled is requested herein.

BACKGROUND

1. Field of the Invention

This invention relates to tree stands and hanging chairs, more specifically to tree stands which are suspended in a desired position with a single rope, chain or the like. The present invention presents a mobile stand which may be readily, silently, and in a controlled manner maneuvered by its occupant, whether at elevation or at ground level, about the entire circumference of the tree to which it is attached, and whereby in combination with independent foot support, such as but not limited to a tree branch or foot-resting hardware attached to the tree, an occupant can quickly and silently make a 90 degree, 180 degree, or greater shift in position without having to stand up, to provide the opportunity for a comfortable and confident shot from anywhere around the entire circumference of the tree. The most preferred embodiment of the present invention comprises a closed tubular frame with a generally trapezoidal configuration, the closed tubular frame having a forwardly angled arcuate top end, downwardly diverging sides, and a bottom rail; back support means which may optionally be reclining; upwardly foldable arm rests; and an upwardly foldable U-shaped seat with flexible material that is connected to the closed tubular frame above the bottom rail.

BACKGROUND

2. Description of Related Art

Tree stands typically used by hunters, photographers and others are rigidly attached to a support structure, such as a tree, pole, or the like. This rigid attachment precludes freedom of movement by the user. Examples of rigidly mounted stands are presented in U.S. Pat. No. 4,337,844 to Hice (1982), U.S. Pat. No. 4,969,538 to Amacker (1990), and U.S. Pat. No. 5,143,177 to Smith (1992). While each of these stands presents a different style, all are obviously intended to remain rigidly attached while in use. U.S. Pat. No. 3,568,797 to Hardy (1971) presents a suspended seat arrangement with up and down mobility that is accomplished with a hand-cranked pulley. However, the Hardy invention provides no lateral or other means of controlled mobility.

There has long been a need for a stand that will move freely with the user in lateral directions about the circumference of a tree. Silent movement is also desired. Users of rigidly mounted tree stands are usually seated such that their backs are toward the tree in a position where they are unable to easily interact with the tree. While so seated in a rigidly mounted tree stand, the hunter would have the opportunity for a comfortable confident shot within an arc of approximately 220 degrees, perhaps less for an archer. However, to gain the advantage of being able to shoot in directions denied him while sitting, the user of a typical prior art tree stand is forced to move the prior art stand relative to the tree, which is difficult for the user to do in a prompt and silent manner to achieve a desired shot, or the user is forced to rise to a standing position which presents safety issues and concerns at elevation. In contrast, the occupant of the present invention mobile stand always faces the tree and while remaining seated is provided with many advantages, including the ability to safely, quietly, promptly, and easily maneuver with the stand in a controlled manner into any position about the entire circumference of the tree in which it is placed. Particularly at elevation and when a prior art tree stand user needs to stand up to achieve a desired shot, if he has been sitting for a long period of time, stiffness may be present and care must be taken to gain a steady standing position. Further, the act of rapidly rising to a standing position can have other undesirable consequences such as noise. Therefore, when a hunter in a prior art stand anticipates the need to stand up to increase the likelihood of a successful shot, he would likely be using a safety harness secured to the tree. However, the type of harnesses typically used in rigidly mounted tree stands become impediments to effective gun and bow alignment. A further undesirable consequence presented by the act of standing to gain shooting position is that of increased anxiety that one's balance might be lost. While safety harnesses that attach to the tree provide some assurance against falling to the ground, such devices provide far less assurance against falling out of the tree stand. The mobile stand of the present invention, through its extensive mobility, allows the user to shoot in any direction without standing up and further, allows the user to employ the tree as a gun rest while doing so. This gun rest advantage improves a hunter's chances for an accurate shot. Four evenly spaced-apart foot rests, which are not a part of the present invention, attached about the circumference of the tree, assist in a hunter's controlled and silent mobility during its use. In the alternative, one or more advantageously positioned tree branches can also be used for support of the hunter's feet. The mobile nature of the present invention tree stand also provides a hunter with the option of using a gun support lanyard that is secured to the uppermost portion of the stand, or to a tethering support member directly attached to the uppermost portion, and moves with the hunter. Thus, the hunter may grasp the lanyard with his gun support hand in such a way as to allow the lanyard to support the weight of his extended arm and the gun, and the lanyard support will be maintained as the hunter moves around the circumference of a tree. Using a lanyard that moves with the hunter will provide sturdy support in situations wherein it is desirable to hold a gun pointed at game while awaiting an open shot. Hunting from a tree stand that can easily be maneuvered into the desired position without the need to stand up is highly desirable and is currently absent from tree stand technology. Due to its design and balance, the likelihood of falling out of the present invention tree stand is extremely slight and even less likely when a safety belt is also used.

An examination of the prior art in the field of hanging chairs teaches a variety of approaches, all different from the present invention. U.S. Pat. No. 3,528,657 to Krupsky (1970) exhibits a rigid frame without arm movement impediment, however, the seating arrangement anticipates that its users will be children placed in the device by adults. Such seating arrangement is not suited to adult use. Generally, other prior art hanging chairs or swings present support or stabilizing ropes, cables or the like which preclude the free and unimpeded arm movement so necessary to the sport of hunting.

Further, it is apparent that patience is necessary to hunting success. The discomfort of buttock fatigue can test one's patience. Prior art tree stands typically provide the user an option of standing to relieve this condition. The present invention mobile stand also allows standing, when used in combination with a tree branch or foot-resting hardware attached to the associated tree, however one embodiment of the mobile stand disclosed herein provides the option of allowing a user to rearwardly recline and shift a portion of his body weight so that it is supported by his back instead of the buttock area. The prior art U.S. Pat. No. 5,316,104 to Amacker (1994) provides an adjustable seat however, positions available to the user are limited to reclining or lounging postures and do not provide the option for the user to fully assume the supine position. In contrast, the reclining feature of the present invention mobile stand allows the user to sit in the fully upright position, or select any of numerous reclining positions between upright and the supine. Further, any of the reclining positions can be achieved easily, promptly, and silently. The reclining feature of the present invention further allows the user to return to the upright position without any adjustment of the stand relative to the associated tree, in the event game is sighted. Thus, different from the prior art, returning the present invention stand to its upright position is readily accomplished easily and silently.

Tree climbing stands are another option for the hunter and comprise a significant percentage of portable tree stands currently in use. While these stands offer advantages, branches often must be removed in order for the user to reach the desired height in the tree. Users of the present invention mobile stand will often find the presence of branches an asset, and the time to remove them would not be required. As previously stated, branches may selectively be used as foot rests by an occupant of the present invention mobile tree stand. Further, it is often convenient to hang the present invention stand itself from a branch. Climbing stands have another disadvantage, in that they are made for use in trees that fall within a certain size range. Use of such stands upon trees outside that size range is impossible or unsafe. The present invention mobile stand may be used in any tree that is large and strong enough to support the weight of its user.

Further, prior art tree stands generally meet one need; that of providing the user with a vantage point substantially above ground level. In contrast, the present invention mobile stand, within its various embodiments, is also readily usable at ground level. Ground level hunting for game animals such as deer, elk and bear is pursued by many. Some remain on the ground by choice, while others do so because of physical or psychological limitations. Numerous patents have been issued for devices that attach to trees at or near ground level. Examples include U.S. Pat. No. 2,851,085 to Woodward (1958), U.S. Pat. No. 3,990,537 to Swenson (1976), and U.S. Pat. No. 5,269,395 to Lyzhoft (1993). However, these devices and others in the prior art do not provide mobility in that they are rigidly attached to the supporting structure. The present invention mobile stand provides advantages over prior art devices when suspended from a tree at ground level. Major advantages of the present invention mobile stand for ground level use are:

(a) The user may assume and maintain a position so that the tree is between the user and the game thereby enjoying a degree of insurance against detection.

(b) The tree may be used as a gun rest for a shot in any direction.

(c) A gun support lanyard that moves with the user may be employed in a manner not available to users of rigidly mounted stands.

In addition to tree stand use, this invention is readily usable by adults and children both indoors and outdoors in recreational pursuits common to hanging chairs. There is no known invention that has all of the features and advantages of the invention disclosed herein.

BRIEF SUMMARY OF INVENTION—OBJECTS AND ADVANTAGES

In view of the shortcomings of prior art devices, as well as disadvantages not specifically mentioned above, it should be apparent that there exists a need in the art for a mobile tree stand which is comfortable, safe and simple to use. It is therefore a primary object of this invention to fulfill this need by providing a mobile stand which is attachable to a tree by use of a single suspending member such as a rope, chain or the like, allows an occupant to remain at elevation for extended periods of time, and also allows an occupant to quickly and silently make a 90 degree, 180 degree, or greater shift in position without having to stand up, thereby providing the occupant with an opportunity for a comfortable and confident shot from anywhere around the entire circumference of the tree. Several other objects and advantages include but are not limited to:

(a) to provide a mobile stand which allows the user to use the tree in which the stand is mounted as an article of concealment against detection by game;

(b) to provide a mobile stand which allows the user to shoot in any direction without the need to stand or otherwise place himself in danger of falling;

(c) to provide a mobile stand which allows the user to employ the tree in which the stand is mounted as a gun rest for a shot in any direction;

(d) to provide a mobile stand which allows the user to maintain a lookout in every direction with a minimum of movement;

(e) to provide a mobile stand which in its various embodiments is readily disassembled at least in part for easier transport and storage;

(f) to provide a mobile stand which in one embodiment provides an optional feature that allows the user to select any of numerous reclining postures and includes the option to lie in a completely supine position;

(g) to provide a mobile stand which is safe to use and provides the user with the perception that he is safe;

(h) to provide a mobile stand which is usable at ground level as well as at any chosen elevation above the ground;

(i) to provide a mobile stand which is readily usable at home or elsewhere, indoors or outdoors in recreational pursuits common to hanging chairs and swings; and (j) to provide redundant safety systems for protection of the reclining occupant at elevation.

Still further objects and advantages will become apparent from a consideration of the ensuing description and drawings.

The present invention comprises a closed tubular frame with a generally trapezoidal configuration, back support means, arm rests, and a seat forwardly extending from the closed tubular frame. Since it is intended for the present invention to be carried on occasion into the woods by a hunter on foot, it is lightweight in construction and optionally can be made for easy dismantling into sub-parts that in their disassembled form have a compact configuration that is easily carried. It is also contemplated for the seat and arm rests to be upwardly foldable toward the closed tubular frame for compact transport and storage, whether the closed tubular frame is divisible into sub-parts or not. Further, the back support means can be reclining, or not, and when it is reclining it typically moves between a nearly upright position and a substantially horizontally-extending position. Further, the closed tubular frame has a generally trapezoidal configuration with a forwardly angled arcuate top end, downwardly diverging sides, and a bottom rail. The seat has a U-shaped configuration that is connected to the closed tubular frame above the bottom rail a sufficient amount to prevent occupant contact with the bottom rail while in a seated position to enhance the occupant's comfort during extended stand use. Back support means may include many variations, including but not limited to the attachment of flexible back support material in the form of strips, webbing, and the like, directly to a portion of the closed tubular frame, a separate back support member that is connected into and becomes a part of the closed tubular frame via crimped connection and the use of fasteners, or a reclining U-shaped back support member that is connected to the closed tubular frame above the seat and does not become a part of the closed tubular frame structure. In addition, although an occupant of the present invention is not required to stand up to maneuver around the circumference of a tree, and its configuration effectively balances a seated occupant to prevent inadvertent separation of the occupant from the seat during routine stand use, for added safety and peace of mind a safety belt can be used with the present invention that encircles its occupant and is secured via one or more additional safety devices, which may include an elongated tether or strap that is independently connected to the overhead support from which the closed tubular frame is suspended. To assist the occupant, although the safety belt would fit tight around the occupant's waist or hip area, in the most preferred embodiment it is contemplated that the safety belt would be connected through fixed brackets attached laterally to opposing sides of the closed tubular frame in a manner that allows the belt to move freely relative to the brackets. Also, it is contemplated that when an independent tether or strap is used, it would be connected through both the safety belt and the fixed brackets to which the safety belt is connected. In addition to the safety belt configuration, other safety features are contemplated for use in combination with other safety devices or alone, including but not limited to at least one pair of safety webbing, cords, cables, rope, hinged members, or straps attached between the closed tubular frame and the rearwardly reclining U-shaped back frame, and at least one pair of cords, cables, rope, hinged members, or straps, which preferably are adjustable, attached between the closed tubular frame and the U-shaped seat frame.

The description herein provides preferred embodiments and should not be construed as limiting the scope of the present invention mobile stand. For example, variations in the configuration of the arm rest members; the number of parts into which it can be dismantled; the size and configuration of the back support means; the materials from which the closed tubular frame is made; the number and type of additional safety features used to independently secure the safety belt means to an overhead structure; the size and configuration of the connecting means between the seat frame and the closed tubular frame, and whether it is adjustable; the size and configuration of the connecting means used between a reclining back support frame and the closed tubular frame; type of materials used for the seat and back support members; other than those shown and described herein may be incorporated into the present invention. Thus the scope of the present invention should be determined by the appended claims and their legal equivalents, rather than being limited to the examples given.

DETAILED DESCRIPTION OF THE INVENTION

Figure 1:
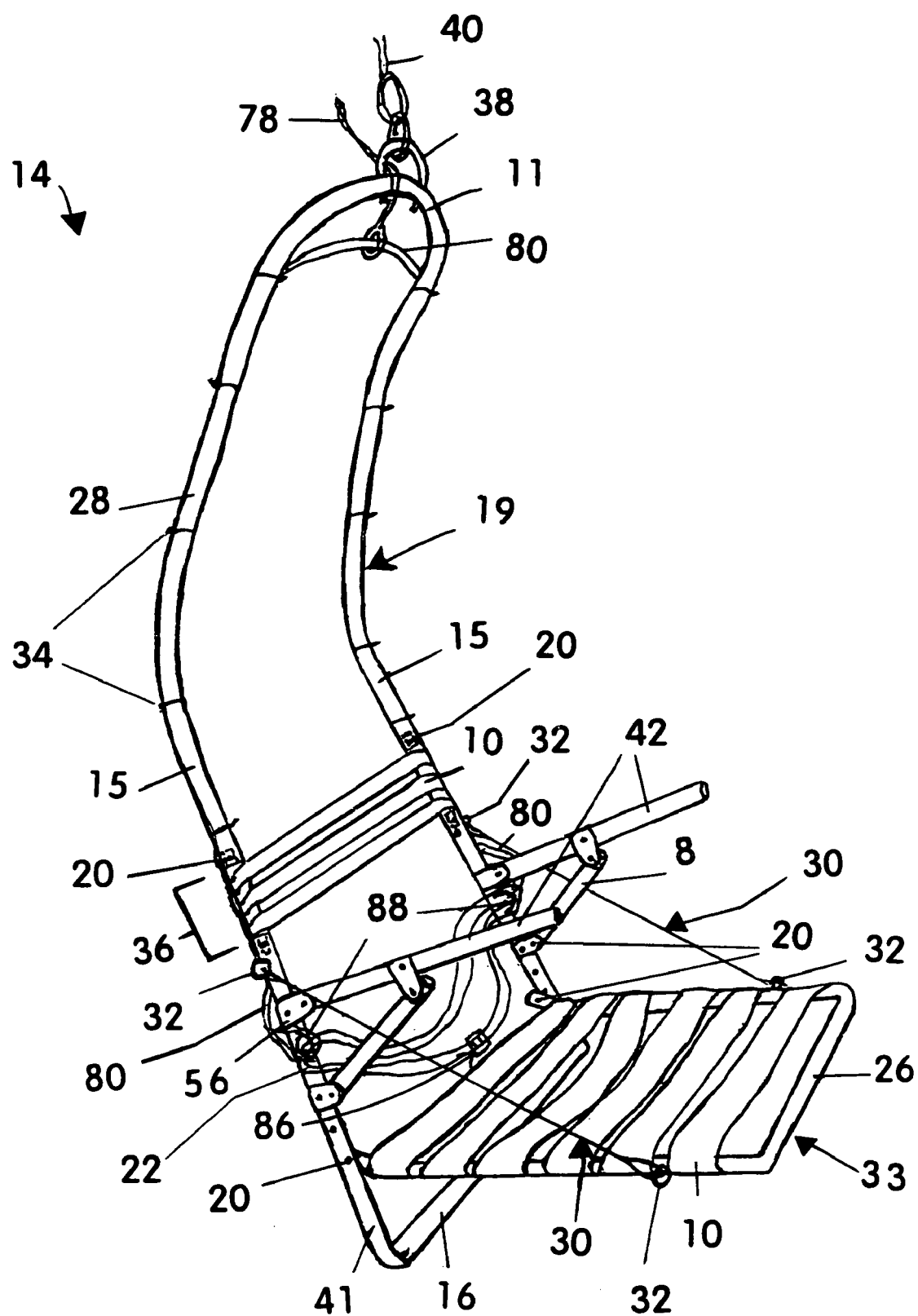
FIG. 1 is a perspective view of a first preferred embodiment of the present invention mobile tree stand suspended from an overhead location by a rope, cable, or chain and having a substantially trapezoidal closed tubular frame with downwardly diverging sides, a forwardly angled arcuate top end, and a bottom rail, with a pivotally connected and U-shaped seat frame forwardly projecting from the closed tubular frame above the bottom rail a sufficient distance to avoid seated occupant contact with the bottom rail, pivotally connected arm rests also forwardly projecting from the closed tubular frame above the seat frame, a back support member integrated into the closed tubular frame above the arm rests, supplementary support means connected means between the seat frame and the closed tubular frame that is preferably adjustable, a safety belt attached via enlarged brackets to the closed tubular frame, and a tethering strap or cord independently securing the safety belt to an overhead support as an additional safety provision for the occupant.
Figure 2:
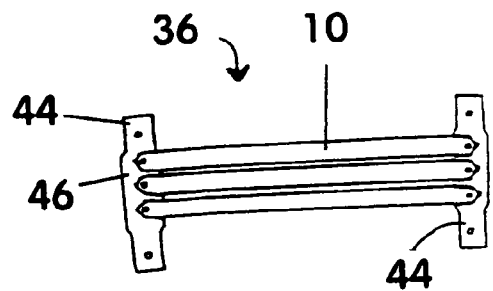
FIG. 2 is an enlarged front view of the back support means in the first preferred embodiment having upper and lower crimped ends.
Figure 6:
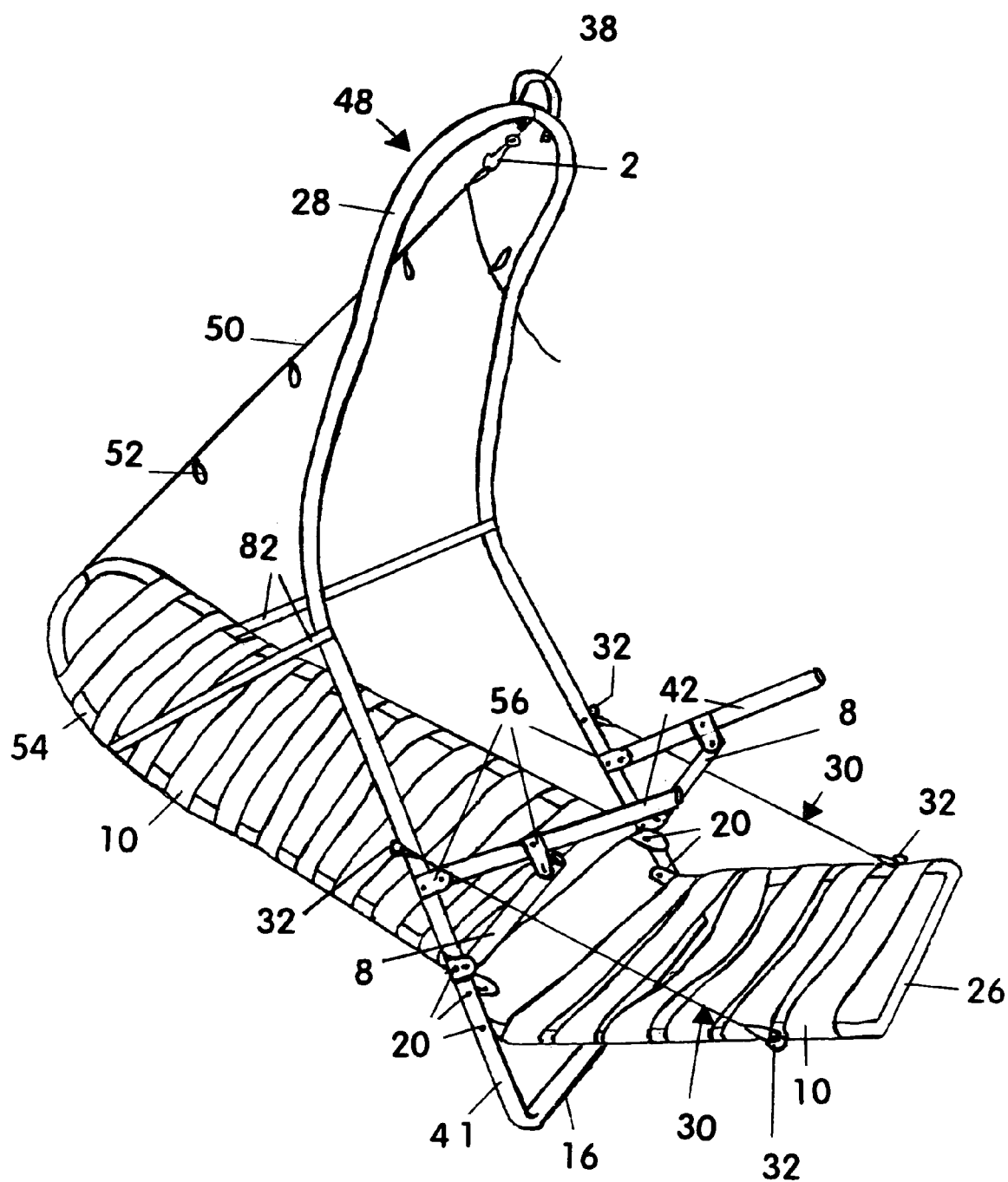
FIG. 6 is a perspective view of a third preferred embodiment of the present invention mobile tree stand configured for suspension from an overhead location by a rope, cable, or chain and having a substantially trapezoidal closed tubular frame having a unitary construction with downwardly diverging sides, a forwardly angled arcuate top end, and a bottom rail, the closed tubular frame the stand also having a pivotally connected and U-shaped seat frame forwardly projecting from the closed tubular frame above the bottom rail a sufficient distance to avoid seated occupant contact with the bottom rail, supplementary support means connected means between the seat frame and the closed tubular frame that is preferably adjustable, pivotally connected arm rests also forwardly projecting from the closed tubular frame above the seat frame, a nearly fully reclined rearwardly reclining U-shaped back support member pivotally connected to the closed tubular frame above the seat frame, a looped means of incrementally and silently lowering the back support member between a substantially upright position and a substantially horizontally-extending rearwardly reclined position, and a supplemental stop means connected between the back support member and the closed tubular frame to prevent the back support member from moving downwardly beyond the maximum intended horizontally-extending reclined position contemplated for routine use.

FIGS. 1 and 2 show the structure of a first preferred embodiment 14 of the present invention mobile tree stand, with FIG. 1 showing a back support 36 in its usable position and FIG. 2 showing an isolated view of back support 36 to reveal the upper and lower crimped ends 44 of the tubular central support members 46 to which flexible material 10 is attached and which are preferred but not critical when back support 36 becomes an integrated part of the generally trapezoidal closed tubular frame 19 of first preferred embodiment 14, which comprises a forwardly angled arcuate top end 11, downwardly diverging sides 15, and a bottom rail 16. FIG. 1 also shows closed tubular frame 19 to be made from the assembled construction of an upper support member 28, a lower support member 41 that includes bottom rail 16, and centrally located back support 36 that allows first preferred embodiment 14 to be readily disassembled for easy transport and storage. Alternatively, unitary construction of closed tubular frame 19 is also contemplated, as shown in FIG. 6, or it may be separable into more than three components for even more compact transport and/or storage as long as the number of components is not so many that the objective of prompt disassembly and reassembly is not compromised. Although FIGS. 1 and 2 show the preferred means of connection between upper support member 28, lower support member 41 and back support 36 being provided by the insertion of the crimped ends 44 of tubular central support members 46 into the tubular open ends of upper support member 28 and lower support member 41, and the securing of the crimped ends 44 via at least one fastener 20, the means of connection between upper support member 28 and lower support member 41 is not critical and may be different than that shown. Although not limited thereto, and not shown in detail in FIG. 1 or FIG. 2, fasteners 20 preferably consist of a bolt or pin. The number and type of fasteners 20 used is not critical, as long as collectively they are sufficiently strong to fulfill their function of maintaining the closed tubular structure of frame 19 while supporting a user's weight. Once fasteners 20 are removed, it is contemplated for the crimped ends 44 of back support 36 to be readily removed from the tubular ends of upper support member 28 and lower support member 41. Although in FIGS. 1 and 2 it is back support 36 having the crimped ends 44 that are inserted into the open tubular configuration of upper support member 28 and lower support member 41, the reverse is also contemplated to be within the scope of the present invention. Further, although not shown in FIG. 1, flexible material 10 can be directly attached to the downwardly diverging sides 15 to form a back support means without using central support members 46, multiple back supports 36 can be integrated into closed tubular frame 19, back supports 36 can be larger or smaller than shown in FIGS. 1 and 2, or a combination of back supports 36 and central supports 46 can be integrated into closed tubular frame 19.

FIG. 1 further shows top end 11 having a mounting bracket 38 that is adapted for connection to a rope, cable, chain, strap, cord, or the like, for suspension of closed tubular frame 19 from a single overhead location, which hereinafter will be referred to as cable 40. Although not shown, for recreational purposes, cable 40 could be replaced by a hooking member or other single overhead support structure. The configuration of mounting bracket 38 is not limited to the U-shaped attachment means shown in FIG. 1. When top end 11 is suspended from a single overhead location, the forwardly extended angle of top end 11 of closed tubular frame 19 assists in the balance of first preferred embodiment 14 while occupied. FIG. 1 also shows a seat 33 forwardly extending from closed tubular frame 19 that has a U-shaped frame 26 and flexible torso supporting seat material 10 attached to frame 26. The configuration of material 10 is not limited to the substantially parallel and laterally extending strips of webbing shown in FIG. 1, although such configuration is preferred. Whatever the configuration of material 10, it should be sufficiently resilient to minimize buttock fatigue of an occupant of first preferred embodiment 14, such as a hunter or photographer who may be required to wait for extended periods of time to gain a desired shot. Also, to further enhance the comfort of the occupant (not shown) of seat 33, the pivoting connection of seat frame 26 to closed tubular frame 19 should be a sufficient distance above bottom rail 16 so as to avoid contact of the occupant with bottom rail 16. In addition, FIG. 1 shows a supplementary support means 30 connected between seat frame 26 and closed tubular frame 19 via rings or eye-bolts 32. The configuration of supplementary support means 30 may vary from that shown in FIG. 1 as long as it performs its function of providing a second means of connection between seat frame 26 and closed tubular frame 19 for safety considerations. The specific use of rings or eye-bolts 32 to fix the opposing ends of supplementary support means 30 is not critical, and although not shown, D-rings or other secure means of securing the ends of supplementary support means 30 can be used and are also considered to be within the scope of the present invention. FIG. 1 shows fasteners 20 securing seat frame 26 to closed tubular frame 19. However, although not shown, it is also contemplated for alternative connection means therebetween to also be considered within the scope of the present invention, such as but not limited to hinged brackets.

Figure 3:
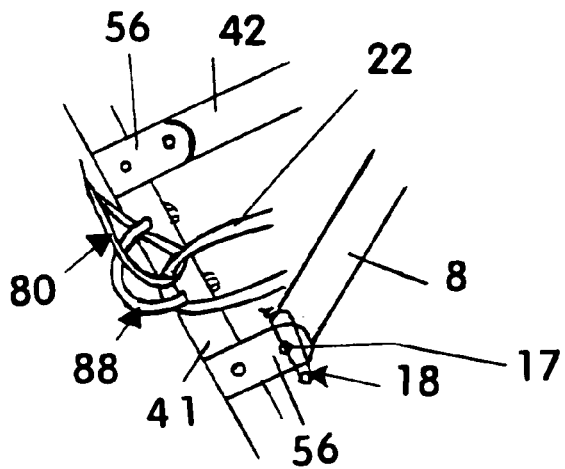
FIG. 3 is an enlarged side view of the safety belt and other safety apparatus arrangement in the first preferred embodiment connected to the portion of the closed tubular frame where attachment of the arm rests occurs, including the safety belt mounting bracket, independent tether connected to both the safety belt and the mounting bracket, and the quick-release clip and keeper pin used to fix the arm rests during use but which are removed before folding the arm rests upwardly into a compact storage configuration.
Figure 5:
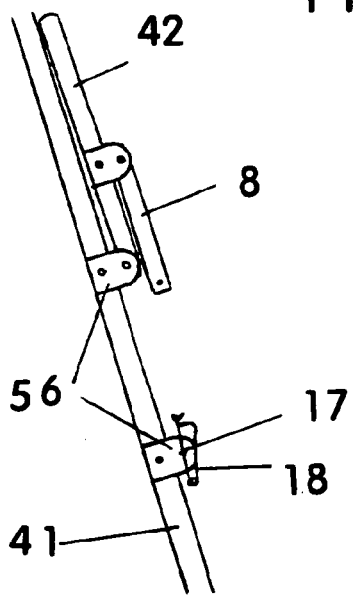
FIG. 5 is a side view of the arm rests in the most preferred embodiments of the present invention upwardly folded into a compact configuration for transport and storage.

FIG. 1 further shows first preferred embodiment 14 having arm rests 42 pivotally connected to closed tubular frame 19 above a forwardly directed seat 33 via mounting brackets 56. A brace 8 connected between closed tubular frame 19 and the central portion of each arm rest 42 supports its associated arm rest 42 while it is in a fully extended position. As shown in FIG. 5 it is contemplated for the pivotal connection to allow the upward folding of arm rests 42 into a position adjacent to closed tubular frame 19 that provides a compact configuration for easy transport and storage. The relative sizes and configurations of mounting brackets 56 are not critical, and may be different from that shown. As shown in FIG. 3, a quick-release clip 18 and keeper pin 17 can be used to immobilize arm rests 42 into a fixed extended position while seat 33 is occupied. Further, it is contemplated for arm rests 42 and closed tubular frame 19 to be made from tubular or rod-like material of any cross-sectional configuration. However, for weight and/or expense considerations, the tubing shown in FIG. 1 with a circular cross-sectional may be preferred. The materials from which closed tubular frame 19, arm rests 42, seat frame 26, material 10, fasteners 20, and mounting bracket 38 are made should be light in weight and resist deterioration by weathering elements.

In addition, FIG. 1 shows an optional safety belt 22 connected to closed tubular frame 19 via enlarged brackets 88 that permit safety belt 22 to slide easily therethrough so as not to uncomfortably bind an occupant of seat 33 when the occupant moves in position relative to seat 33 and arm rests 42. FIG. 1 also shows and a tethering strap or cord 80 connected through enlarged brackets 88 and safety belt 22 on each side of closed tubular frame 19 to independently secure safety belt 22 to an overhead location (not shown) as an additional safety provision for the occupant of seat 33. FIG. 1 further shows an additional cord, chain, cable, or the like 78 upwardly extending from tethering strap or cord 80 for connection of tethering strap or cord 80 to the overhead location. FIG. 1 also shows the additional cord, chain, cable, or the like 78, hereinafter referred to as additional cord 78, being inserted through the mounting bracket 38 connected to top end 11, as well as tethering strap or cord 80 extending substantially behind closed tubular frame 19 and attached thereto in multiple locations above arm rests 42 via individual ties 34, which can include but are not limited to clamps and/or disposable quick-tightening plastic ties that may be trimmed close to closed tubular frame 19 so as not to interfere with the movement of an occupant of seat 33 needed to obtain a comfortable and confident shot. The number of ties 34 used is not critical. FIG. 3 shows safety belt 22 and other safety apparatus arrangement in first preferred embodiment 14 connected to the portion of closed tubular frame 19 where attachment of the arm rests 42 occurs, including the safety belt mounting bracket 88, independent tethering strap or cord 80 that is connected through both safety belt 22 and safety belt mounting bracket 88. FIG. 3 also shows the quick-release clip 18 and keeper pin 17 used to fix the position of arm rests 42 during use but which are removed before the folding of arm rests 42 upwardly into a compact storage configuration adjacent to closed tubular frame 19. FIG. 5 shows the arm rests 42 of the preferred embodiments 14, 24, and 48 of the present invention upwardly and compactly folded into one contemplated transport or storage configuration. The safety devices shown in FIG. 1 include a looped belt 84 and a buckle 86, a pair of brackets 88 attached to closed tubular frame 19 for use in supporting belt 84, and an elongated strap 80 that is wrapped around upper support member 28, has each end secured by one of the brackets 88, and is supported by an independent tether 78. Use of all the illustrated safety devices illustrated in FIG. 1 is preferred, in combination, for general safety purposes, the perception of safety, and to provide back up for equipment failure and occupant error in the reassembly of previously disassembled stands. However the configurations of the safety devices shown in FIG. 1 are not critical and it is also contemplated for the present invention to include use of other types of safety belts, independent tethers, and/or rigid, flexible and/or pivoting supports between back support 54 and upper support member 28, as long as they do not restrict an occupant's mobility. The looped-type of seatbelt 84 shown in FIGS. 5 and 7 would be tightened around the waist or hips of a present invention occupant. Buckle 86 would permit adjustment of the diameter of seatbelt 84 so that it can fit snug around the present invention occupant during use. In contrast, brackets 88 should allow the insertion of seatbelt 84 therethrough so that seatbelt 84 can move freely through brackets 88 to enhance comfort during use. Although brackets 88 could be adjustable, it is preferred that they are not adjustable and remain securely fixed to closed tubular frame 19. Although not shown, fasteners can be used to secure brackets 88 to closed tubular frame 19, or brackets 88 can be otherwise bonded to closed tubular frame 19.

Figure 7:
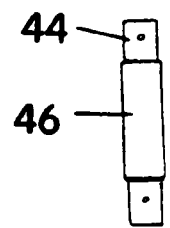
FIG. 7 is a front view of one of the central support members used in the middle portion of the second preferred embodiment and having crimped upper and lower ends.
Figure 4:
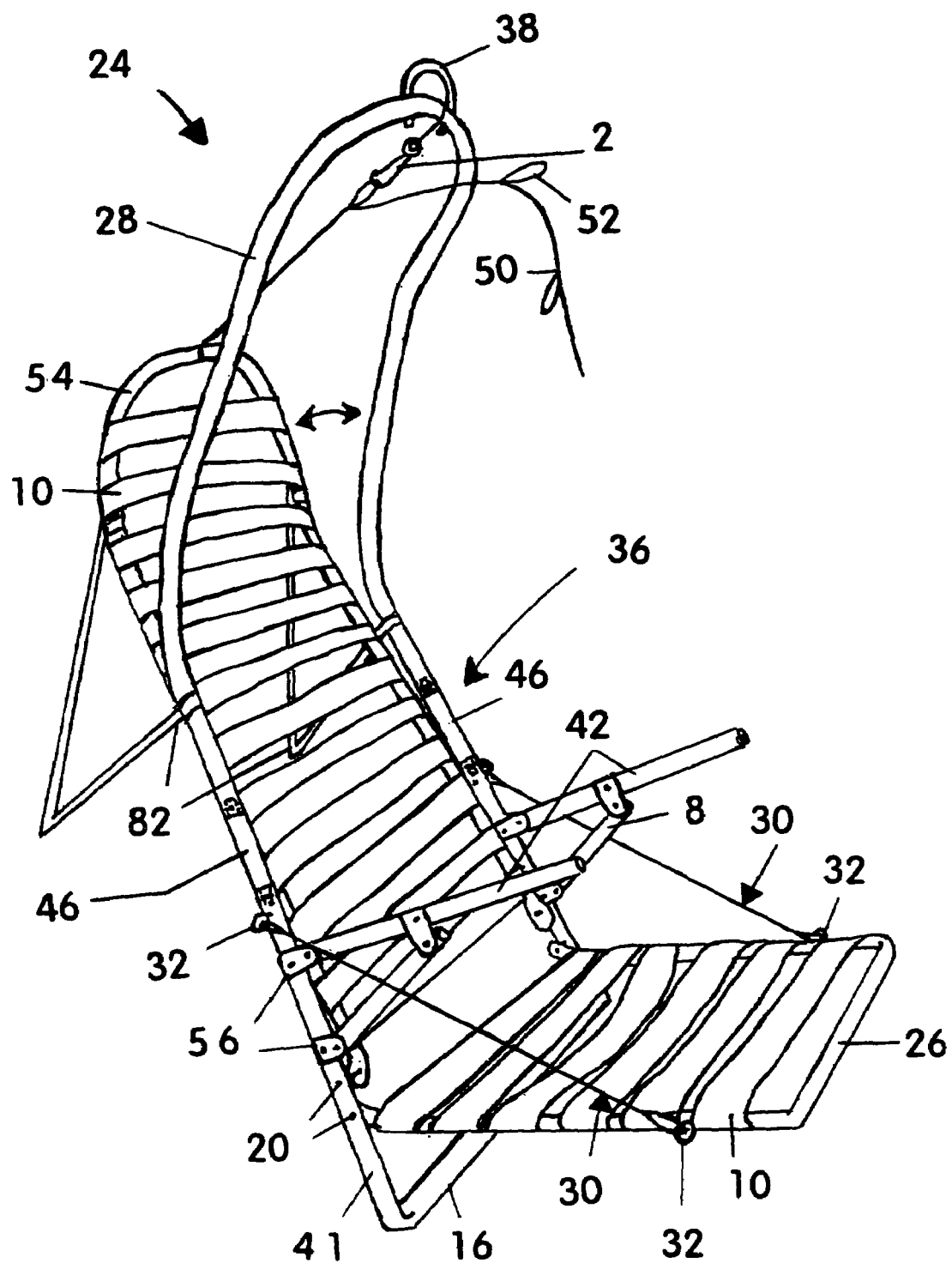
FIG. 4 is a perspective view of a second preferred embodiment of the present invention mobile tree stand configured for suspension from an overhead location by a rope, cable, or chain and having a substantially trapezoidal closed tubular frame with downwardly diverging sides, a forwardly angled arcuate top end, and a bottom rail, the closed tubular frame also being separable into upper, middle and lower portions for break-down of the closed tubular frame into a more compact configuration for easier transport and storage, the stand also having a pivotally connected and U-shaped seat frame forwardly projecting from the closed tubular frame above the bottom rail a sufficient distance to avoid seated occupant contact with the bottom rail, supplementary support means connected means between the seat frame and the closed tubular frame that is preferably adjustable, pivotally connected arm rests also forwardly projecting from the closed tubular frame above the seat frame, a rearwardly reclining U-shaped back support member pivotally connected to the closed tubular frame above the seat frame, a looped means of incrementally and silently lowering the back support member between a substantially upright position and a substantially horizontally-extending rearwardly reclined position, and a supplemental stop means connected between the back support member and the closed tubular frame to prevent the back support member from moving downwardly beyond the maximum intended horizontally-extending reclined position contemplated for routine use.

FIG. 4 shows a second preferred embodiment 24 of the present invention mobile tree stand configured for suspension from an overhead location by a rope, cable, or chain (shown in FIG. 1 by the number 40) and having a substantially trapezoidal closed tubular frame 19 with downwardly diverging sides 15, a forwardly angled arcuate top end 11, and a bottom rail 16, the closed tubular frame 19 also being separable into an upper portion 28, a middle portion 36, and a lower portion 41 for break-down of closed tubular frame 19 into a more compact configuration for easier transport and storage. FIG. 4 also shows second preferred embodiment 24 having a pivotally connected seat 33 with a U-shaped seat frame 26 and flexible material 10 forwardly projecting from closed tubular frame 19 above bottom rail 16 a sufficient distance to avoid seated occupant contact with bottom rail 16. Since a portion of many seated occupants extends rearwardly beyond the U-shaped seat 33, avoiding contact with bottom rail 16 enhances user comfort while in both seated and reclining postures. FIG. 4 further shows second preferred embodiment 24 having supplementary support means 30 connected means between seat frame 26 and closed tubular frame 19 via rings or eye-bolts 32. Preferably supplementary support means 30 is adjustable. The configuration of supplementary support means 30 may vary from that shown in FIG. 4 as long as it performs its function of providing a second means of connection between seat frame 26 and closed tubular frame 19 for safety considerations. The specific use of rings or eye-bolts 32 to fix the opposing ends of supplementary support means 30 is not critical, and although not shown, D-rings or other secure means of securing the ends of supplementary support means 30 can be used and are also considered to be within the scope of the present invention. Further, supplementary support means 30 may be made from woven or non-woven materials, at the option of the manufacturer. However, resistance to deterioration by weathering elements and lightweight construction are important considerations in selecting the materials used for supplementary support means 30. FIG. 4 further shows second preferred embodiment 24 having pivotally connected arm rests 42 forwardly projecting from closed tubular frame 19 above seat frame 26, a rearwardly reclining U-shaped back support member 54 pivotally connected to closed tubular frame 19 above seat frame 26, a looped means 50 of incrementally and silently lowering back support member 54 between a substantially upright position and a substantially horizontally-extending rearwardly reclined position, and a supplemental stop means 82 connected between back support member 54 and closed tubular frame 19 that is provided as a safety feature to prevent back support member 54 from moving downwardly beyond the maximum intended horizontally-extending reclined position contemplated for routine occupant use. FIG. 7 shows the central support members 46 used in the middle portion 36 of second preferred embodiment 24 having crimped upper and lower ends 44. However, although not shown, central support members 46 may in the alternative have a tubular end configuration with the upper portion 28 and lower portion 41 to which it would be connected having the crimped ends 44. Further in the alternative, although not shown, the present invention could include an embodiment wherein middle portion 36 is an integrated part of either upper portion 28 or lower portion 41. Further, although not shown, the means of overhead suspension provided as a part of second preferred embodiment 24 need not be limited to rope, chain or cable 40, but may include any suspension means or combination of suspension means that supports the weight of the heaviest contemplated occupant of seat 33. The number of fasteners 20 used in any crimped connection used between upper portion 28, middle portion 36, and lower portion 41 is not critical, as long as a secure connection is achieved for occupant use. Further, the supplemental stop means 82 may be made from flexible material, or be rigid and have a pivoting configuration. If comprising flexible material or straps, two such straps or other extensions between back support member 54 and closed tubular frame 19 may be sufficient as long as they together are able to support the entire weight of the heaviest occupant contemplated for the present invention. Also, the type of tether 78 used and the manner in which it is secured to elongated strap 80 is not critical, as long as it is capable of supporting the entire weight of the present invention occupant.

FIG. 6 shows a third preferred embodiment 48 of the present invention mobile tree stand configured for suspension from an overhead location by a rope, cable, or chain 40, and having a substantially trapezoidal closed tubular frame 19 with a unitary construction and downwardly diverging sides 15, a forwardly angled arcuate top end 11, and a bottom rail 16. Third preferred embodiment 48 is different from the second preferred embodiment 24 shown in FIG. 4, since third preferred embodiment 48 has a unitary construction. Further, in FIG. 6 third preferred embodiment 48 with its back support member 54 in a nearly horizontally-extending reclining position. The second preferred embodiment 24 of the present invention, shown in FIG. 4, and the third preferred embodiment 48 shown FIG. 5 both allow a user to select any of numerous reclining postures to obtain better positioning to take a shot and/or relieve buttock fatigue, and include an option for the user to lie in a completely supine position. However, where compact transport and/or storage are prime considerations, second preferred embodiment 24 would be selected for use instead of third preferred embodiment 48. FIG. 6 shows a pivotally connected seat 33 having a U-shaped seat frame 26 and flexible material 10 forwardly projecting from closed tubular frame 19 a sufficient distance above bottom rail 16 to avoid seated occupant contact with bottom rail 16 and enhance user comfort in both upright and reclining positions. In addition, FIG. 6 shows a supplementary support means 30 connected between seat frame 26 and closed tubular frame 19 that is preferably adjustable. One option for adjustability is a turnbuckle. Pivotally connected arm rests 42 also forwardly project from closed tubular frame 19 above seat frame 26, a looped means 50 of incrementally and silently lowering the back support member 54 between a substantially upright position and a substantially horizontally-extending rearwardly reclined position is attached on one of its ends to back support member 54 with one of its loops 52 engaging clip 2, and a supplemental stop means 82 is connected between the back support member 54 and the closed tubular frame 19 to prevent the back support member 54 from moving downwardly beyond the maximum intended horizontally-extending reclined position contemplated during routine occupant use. Although safety belt 22 is only shown in FIG. 1, it is also contemplated for safety belt 22 and other associated safety features, such as but not limited to tethering strap or cord 80 and the independently attached safety tether referred to above as additional cord 78 that engages tethering strap or cord 80, to be used with any of the preferred embodiments of the present invention. Use of all the illustrated safety devices illustrated in FIGS. 1, 4, and 6 is preferred, in combination, in all of the reclining embodiments of the present invention for general safety purposes, the perception of safety, and to provide back up for equipment failure and occupant error in the reassembly of previously disassembled stands. However the configurations of the safety devices shown in FIGS. 1, 4, and 6 are not critical and it is also contemplated for the present invention to include use of other types of safety belts, independent tethers, and/or rigid, flexible and/or pivoting supports between back support 54 and upper support member 28, as long as they do not restrict an occupant's mobility. Although FIGS. 4 and 6 further show a preferred means of incrementally lowering back support 54 between a substantially upright position and a horizontally extending rearwardly reclined position, other means of silently lowering and raising back support member 54 are also considered to be a past of the present invention. Thus, although not limited thereto, the preferred means for changing the position of back support 54 includes a flexible line 50 having spaced-apart loops 52 along its length that are appropriate in size for insertion of clip 2. The configuration of clip 2 can vary from that shown in FIGS. 4 and 6, as long as it is able to securely fix flexible line 50 to prevent further rearward movement of back support member 54. Thus, clip 2 and loops 52 can be employed by a user waiting for game to periodically adjust back support 54 into any of several rearwardly reclined positions according to user comfort, including a substantially horizontally extending position, and even the user in a supine position is able to promptly and silently return to the upright position in the event game is sighted, without any stand adjustment of any kind. Back support 54 would remain in its lowered position until such time as the user employs clip 2 and a different loop 52 to make an adjustment in the angular orientation of back support 54 relative to closed tubular frame 19. Although not shown and not limited thereto, a means of attaching the surplus distal length of line 50 in an out-of-the-way position to closed tubular frame 19 can comprise one or more lengths of plastic tubing secured to one side of closed tubular frame 19, and/or one or more hook-and-loop fasteners.

Figure 8:
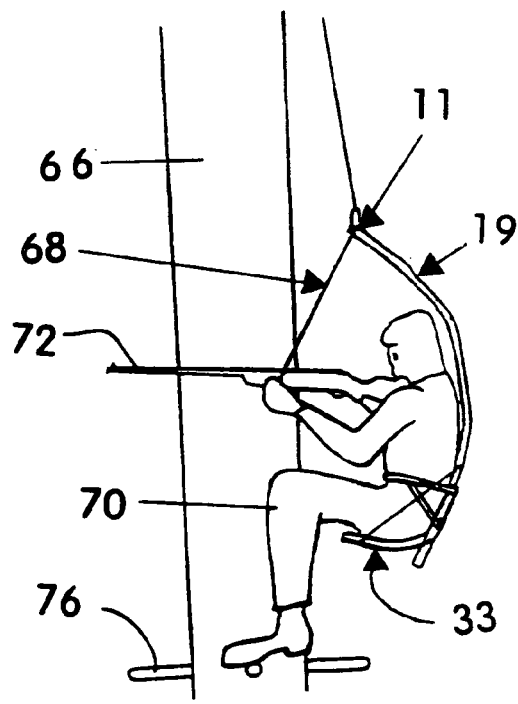
FIG. 8 is a side view of a hunter occupying the first preferred embodiment of the present invention while it is suspended adjacent to a tree from an overhead location, with the hunter facing the tree and aiming a gun with the assistance of a gun support lanyard connected to the top end of the closed tubular frame so that the gun support lanyard is able to move unrestricted with the hunter as the position of the stand is changed relative to the tree, with the hunter also using foot supports that are not a part of the present invention to assist in rapid, silent, and controlled mobility of the stand around the circumference of the tree.

FIG. 8 shows a hunter 70 occupying the first preferred embodiment 14 of the present invention while it is suspended adjacent to a tree 66 from an overhead location (not shown), with hunter 70 facing tree 66 and aiming a gun 72 with the assistance of a gun support lanyard 68 connected to the top end 11 of closed tubular frame 19 so that the gun support lanyard 68 is able to move in an unrestricted manner with hunter 70 as the position of closed tubular frame 19 is changed relative to the circumference of tree 66. The hunter 70 may grasp lanyard 68 with his gun support hand in such a way as to allow lanyard 68 to support the weight of his extended arm and gun 72. Such a lanyard 68 will provide sturdy support in situations wherein it is desirable to hold gun 72 pointed at game while awaiting an open shot and will move with hunter 70 during any shift in position of hunter 70 or gun 72 around tree 66. Lanyard 68 may be used at will in most hunting situations and may often be useful because some guns, especially black powder guns, are long and heavy. FIG. 8 also shows hunter 70 using foot supports 76 that are not a part of the present invention to assist in rapid, silent, and controlled mobility of closed tubular frame 19 around the circumference of tree 66. Although not contemplated to be limited in number or the configuration shown in FIG. 8, it is preferred that four foot supports 76 be used that are evenly spaced-apart from one another about the circumference of tree 66. For safety reasons, each foot support 76 must be sufficiently strong to support the full weight of the present invention occupant. In addition to providing a means of general support for the feet of hunter 70, the hunter 70 occupying seat 33 and remaining in a seated position can push his feet against foot supports 76 to launch himself and the present invention simultaneously into a position ninety or one-hundred-eighty degrees away from the original starting position. Also, similar abrupt changes in position can be easily, promptly, and silently achieved. Further, although not shown and not required, in addition to or in place of foot supports 76, a rigidly mounted platform of the type commonly employed in tree stand technology, may be used as an option with any embodiment of the present invention tree stand, including first preferred embodiment 14, second embodiment 24, and third preferred embodiment 48. Also, several readily available screw-in steps or strap-on steps (not shown) could be used with the present invention in place of the foot supports 76 shown in FIG. 8.

All of the preferred embodiments of the present invention mobile stand are comfortable, safe and simple to use and may be employed in any tree 66 large and strong enough to support the weight of hunter 70. They attach to tree 66, or a large branch thereof, by use of a single overhead suspending member such as a rope, chain, cable, strap, or the like, and in addition to providing safe positioning for hunter 70, they provide hunter 70 with the perception that he is safe. The preferred embodiments of the present invention mobile stand provide hunter 70 with the ability to safely, quietly and easily maneuver into any position about the entire circumference of tree 66 to maintain a lookout in every direction. Also, hunter 70 can easily achieve a quick ninety degree, one-hundred-eighty degree, or greater shift in position while an occupant of the present invention tree stand without needing to stand up, and do so silently. Foot supports 76, platforms, tree branches, or a combination thereof, can further assist the controlled mobility of hunter 70. When foot supports 76 alone are used to assist the controlled mobility of hunter 70 while in the present invention tree stand, they would be secured within bores in tree 66 and evenly spaced-apart about its circumference. Hunter 70 may also assume and maintain a position so that tree 66 is between him and the game, thereby enjoying a degree of insurance against detection. The preferred embodiments of the present invention mobile stand further allow hunter 70 to use tree 66 as a rest for gun 72. The gun rest advantage improves the chances for hunter 70 to obtain an accurate shot. Optionally, the preferred embodiments of the present invention mobile stand are also readily usable at ground level. Any safety devices used, such as but not limited to safety belt 22, supplementary support means 30, and/or supplemental stop means 82 would be configured so as not to diminish the mobility of hunter 70. Ground level hunting for game animals, including deer, elk and bear, is pursued by many. Some hunters 70 remain on the ground by choice, while others do so because of physical or psychological limitations. Further, in addition to tree stand use, the present invention is readily usable by adults and children both indoors and outdoors in recreational pursuits common to hanging chairs and swings, and is particularly useful where unrestricted arm movement would provide an advantage. For convenience when transport and/or storage of the present invention is contemplated, the most preferred embodiments of the present invention stand are also readily disassembled into component parts that can be gathered into a compact configuration. Variations can occur in, but are not limited to, the materials from which the components are made; the degree of resistance of the components to deterioration from weathering elements; the overall weight of the stand; the configuration and location of arm rests 42 relative to closed tubular member 19; the number of parts into which the stand can be dismantled for transport or storage; and the size and configuration of the back support used.

What is claimed is:

1. A manually-operated mobile stand that moves freely with a seated occupant and is suspended from a single overhead location, said mobile stand comprising:

a closed tubular frame having a generally trapezoidal configuration with an arcuate upper end, opposing sides that downwardly diverge from one another, and a horizontally extending bottom rail, said arcuate upper end also being forwardly angled;

attachment means connected to said arcuate upper end and adapted for connecting said uppermost end to a single overhead location;

a seat connected to said closed tubular frame above said horizontally extending bottom rail, said seat having a U-shaped seat frame and flexible material;

tubular arm rest means attached to each of said opposing sides of said closed tubular frame above said seat; and back support means connected to said closed tubular frame so that when said attachment means is connected to a single overhead location in close proximity to a tree and an occupant is positioned on said seat, while facing the tree the seated occupant is able to employ hands, arms, legs, and feet in varying combination to promptly, silently, and in a controlled manner change position of said mobile stand relative to the tree into any position about the circumference of the tree to achieve a comfortable and confident shot in any direction.

2. The mobile stand of claim 1 wherein said closed tubular frame is selected from a group consisting of frames having a unitary construction and frames made from assembled construction.

3. The mobile stand of claim 1 further comprising a plurality of fasteners, and wherein said closed tubular frame has an upper portion and a lower portion that are joined by a crimped connection therebetween and said fasteners.

4. The mobile stand of claim 1 further comprising a plurality of fasteners, and wherein said closed tubular frame has an upper portion, at least one middle portion, and a lower portion that are joined by a crimped connection therebetween and said fasteners.

5. The mobile stand of claim 4 wherein one of said at least one middle portions comprises said back support means.

6. The mobile stand of claim 1 wherein said arm rest means and said seat have pivoting connection to said closed tubular frame and are configured for upward movement toward said closed tubular frame, and said upward movement occurs between an open position appropriate for the seating of an occupant and a closed and compact configuration appropriate for convenient transport and storage.

7. The mobile stand of claim 1 further comprising safety belt means connected to said closed tubular frame above said seat.

8. The mobile stand of claim 7 further comprising elongated strap means and an independent tethering means connected to said safety belt means.

9. The mobile stand of claim 8 wherein said elongated strap means is secured to said frame at multiple locations above said arm rest means.

10. The mobile stand of claim 1 further comprising supplementary support means connected between said closed tubular frame and said seat.

11. The mobile stand of claim 10 wherein said supplementary support means is adjustable.

12. The mobile stand of claim 1 wherein said back support means comprises a substantially U-shaped tubular back frame with an arcuate top end and an open bottom end, and further wherein said open bottom end is pivotally connected to said closed tubular frame, and further comprising a supporting means configured to allow said back frame to be moved rearwardly from said closed tubular frame and allow an occupant on said seat to assume a plurality of reclining postures.

13. The mobile stand of claim 12 wherein said back frame is adjustable relative to said closed tubular frame between a substantially upright position and a substantially horizontally-extending position.

14. The mobile stand of claim 12 further comprising supplemental stop means connected between said closed tubular frame and said back frame.

15. The mobile stand of claim 14 wherein said supplemental stop means is selected from a group consisting of flexible cords, chains, rope, webbing material, cables, straps, stays, and hinged members.

16. The mobile stand of claim 12 further comprising a line with a proximal end connected to said top end of said back frame, wherein said attachment means comprises a hooking means configured for suspending said top end of said back frame, and further wherein said line has a plurality of loops each configured for removable attachment to said hooking means to provide silent adjustment of said back frame into desired positions between substantially upright and substantially horizontally-extending positions through connection of different ones of said loops to said hooking means.

17. The mobile stand of claim 1 further comprising a gun support lanyard with a proximal end and attachment means for said proximal end that is selected from a group consisting of said top end of said closed tubular frame, said attachment means, and any suspension means connected between said attachment means and an overhead location.

18. A manually-operated mobile stand that moves freely with a seated occupant and is suspended from a single overhead location, said mobile stand comprising:

a closed tubular frame having a generally trapezoidal configuration with an arcuate upper end, opposing sides that downwardly diverge from one another, and a horizontally extending bottom rail, said arcuate upper end also being forwardly angled;

attachment means connected to said arcuate upper end and adapted for connecting said uppermost end to a single overhead location;

a seat connected to said closed tubular frame above said horizontally extending bottom rail, said seat having a U-shaped seat frame and flexible material;

tubular arm rest means attached to each of said opposing sides of said closed tubular frame above said seat;

wherein said arm rest means and said seat frame have pivoting connection to said closed tubular frame and are configured for upward movement toward said closed tubular frame so that said upward movement occurs between an open position appropriate for the seating of an occupant and a closed and compact configuration appropriate for convenient transport and storage;

supplementary support means connected between said closed tubular frame and said seat frame; and back support means connected to said closed tubular frame so that when said attachment means is connected to a single overhead location in close proximity to a tree and an occupant is positioned on said seat, while facing the tree the seated occupant is able to employ hands, arms, legs, and feet in varying combination to promptly, silently, and in a controlled manner change position of said mobile stand relative to the tree into any position about the circumference of the tree to achieve a comfortable and confident shot in any direction.

19. The mobile stand of claim 18 further comprising safety belt means connected to said closed tubular frame above said seat, elongated strap means and an independent tethering means connected to said safety belt means, and wherein said elongated strap means is secured to said frame at multiple locations above said arm rest means.

20. The mobile stand of claim 18 wherein said closed tubular frame is selected from a group consisting of frames having a unitary construction and frames made from assembled construction, and said supplementary support means is adjustable.

* * * * *